United States Patent
Tan et al.

(10) Patent No.: US 12,311,627 B2
(45) Date of Patent: May 27, 2025

(54) MODULAR WIND TURBINE BLADE AND MANUFACTURING METHOD THEREOF

(71) Applicant: NEWTECH GROUP CO., LTD., Changzhou (CN)

(72) Inventors: Kunlun Tan, Changzhou (CN); Lei Cao, Changzhou (CN); Gaoyu Bai, Changzhou (CN); Yelin Liu, Changzhou (CN); Qiuping Du, Changzhou (CN); Zhicheng Zhang, Changzhou (CN); Yubin Zhu, Changzhou (CN); Xiaotian Zheng, Changzhou (CN)

(73) Assignee: NEWTECH GROUP CO., LTD., Changzhou (CN)

( * ) Notice: Subject to any disclaimer, the term of this patent is extended or adjusted under 35 U.S.C. 154(b) by 0 days.

(21) Appl. No.: 18/225,508

(22) Filed: Jul. 24, 2023

(65) Prior Publication Data

US 2023/0364875 A1  Nov. 16, 2023

Related U.S. Application Data

(63) Continuation of application No. PCT/CN2022/114461, filed on Aug. 24, 2022.

(30) Foreign Application Priority Data

Sep. 10, 2021 (CN) .......................... 202111063538.3

(51) Int. Cl.
*B29D 99/00* (2010.01)
*F03D 1/06* (2006.01)
*F03D 13/30* (2016.01)

(52) U.S. Cl.
CPC ....... *B29D 99/0028* (2013.01); *F03D 1/0677* (2023.08); *F03D 1/0679* (2023.08); *F03D 13/30* (2016.05); *F05B 2230/60* (2013.01)

(58) Field of Classification Search
CPC .... F03D 1/0675; F03D 1/0677; F03D 1/0679; F03D 13/10; F05B 2240/302; B29D 99/0028
See application file for complete search history.

(56) References Cited

U.S. PATENT DOCUMENTS

| | | | |
|---|---|---|---|
| 10,730,247 B2 * | 8/2020 | Hansen | .................... B29C 70/22 |
| 2008/0206062 A1 * | 8/2008 | Sanz Pascual | ........ F03D 1/0675 416/232 |

(Continued)

FOREIGN PATENT DOCUMENTS

| | | |
|---|---|---|
| CN | 101255847 A | 9/2008 |
| CN | 103144312 A | 6/2013 |

(Continued)

*Primary Examiner* — Woody A Lee, Jr.
*Assistant Examiner* — Jesse M Prager
(74) *Attorney, Agent, or Firm* — SZDC Law PC

(57) ABSTRACT

A modular wind turbine blade includes a blade root, an intermediate portion and a blade tip. The intermediate portion includes a plurality of modular blades, two adjacent modular blades being provided at edge thereof with a first connecting portion and a second connecting portion that cooperate with each other, and wherein the plurality of modular blades includes a trailing edge shell, a leading edge shell and a main beam, respectively, the first connecting portion at the edge of the trailing edge shell and the leading edge shell being fixedly connected to the second connecting portion at the edge of the main beam. The wind turbine blade according to the present invention adopts segmented modular structural design, which effectively reduces the mold occupancy time of the blade, shortening the production cycle and improving the molding efficiency.

7 Claims, 4 Drawing Sheets

(56) References Cited

U.S. PATENT DOCUMENTS

2017/0030330 A1    2/2017  Caruso et al.
2021/0115893 A1*  4/2021  Rinck .................. F03D 1/0675

FOREIGN PATENT DOCUMENTS

| | | | | |
|---|---|---|---|---|
| CN | 105508131 A | 4/2016 | | |
| CN | 106499578 A | 3/2017 | | |
| CN | 111775456 A | 10/2020 | | |
| CN | 113137346 A | 7/2021 | | |
| CN | 113323797 A | 8/2021 | | |
| CN | 113787658 A | 12/2021 | | |
| CN | 216767625 U | 6/2022 | | |
| EP | 3002452 A1 * | 4/2016 | ........... | F03D 1/0675 |
| EP | 3808972 A1 * | 4/2021 | ........... | F03D 1/0675 |
| ES | 2343712 A1 * | 8/2010 | ........... | F03D 1/0675 |
| WO | WO-2020216927 A1 * | 10/2020 | ............. | B29C 65/48 |

* cited by examiner

MODULAR WIND TURBINE BLADE AND MANUFACTURING METHOD THEREOF

This application is a Continuation Application of PCT/CN2022/114461, filed on Aug. 24, 2022, which claims priority to Chinese Patent Application No. 202111063538.3, filed on Sep. 10, 2021, which is incorporated by reference for all purposes as if fully set forth herein.

TECHNICAL FIELD

The invention relates to the technical field of wind power generation equipment, in particular to a modular wind turbine blade and a manufacturing method thereof.

BACKGROUND

With the development of the world, energy, as the driving force of the world development, plays a pivotal position in the development, and the development of renewable energy is the inevitable trend of the world. As a pollution-free and renewable new energy source, wind energy has enormous development potential. Especially for coastal islands, remote mountainous areas with inconvenient transportation, vast grasslands and meadows with sparse population, as well as rural and border areas far away from the power grid and difficult to connect to the power grid in the near future, wind energy as a reliable way to provide production and living energy is of great significance. Wind turbine blades play a crucial role in wind power generation technology.

In the existing manufacturing process of wind turbine blades, the mold occupancy time of the blades becomes a huge bottleneck in the blade molding process. How to reduce the mold occupancy time becomes a top priority in the blade manufacturing process.

In view of the above-mentioned problems, the inventor actively carried out research and innovation based on the rich practical experience and professional knowledge in the engineering applications of such products for many years, in order to create a modular wind turbine blade and a manufacturing method thereof that is more practical.

SUMMARY

The technical problem to be solved by the present invention is to provide a modular wind turbine blade and a manufacturing method thereof, effectively reducing the mold occupation time of wind turbine blades.

To this end, the present invention proposes a modular wind turbine blade comprising a blade root, an intermediate portion and a blade tip, wherein the intermediate portion comprises a plurality of modular blades, two adjacent modular blades being provided at edge thereof with a first connecting portion and a second connecting portion that cooperate with each other, and wherein the plurality of modular blades includes several trailing edge shells, several leading edge shells and several main beams, respectively, the first connecting portion at the edge of the trailing edge shell and the leading edge shell being fixedly connected to the second connecting portion at the edge of the main beam.

Furthermore, the main beam includes a main support beam for connecting the leading edge shell and a secondary support beam for connecting the trailing edge shell, the main support beam being fixedly connected to the secondary support beam through the cooperation of the first connecting portion and the second connecting portion.

Further, the main support beam and the secondary support beam are each provided with a connecting beam, the connecting beam being vertically provided with a fixing recess for fixing a web, the corner of the fixing recess and the connecting beam being an arc transition.

Further, the first connecting portion is a boss and the second connecting portion is provided with a recess matching the first connecting portion, the boss being embedded in the recess and fixedly connected by means of structural adhesive.

Further, the main support beam resembles a shovel-shaped structure close to the connection end of the wind turbine blade segments and a connecting edge extends towards the interior of the wind turbine blade along the edge of the shovel-shaped structure, an end of the connecting edge intersecting with the connecting beam to form a closed area.

The closed area is in the form of a symmetrical trapezoid, the secondary support beam and the leading edge shell are provided with a mounting section corresponding to the trapezoid, and the mounting section is provided at the edge thereof with a fixing edge that matches a bent edge of the connecting edge.

Furthermore, an enhancement limiting edge of the connecting edge located between the two symmetrical bent edges is provided perpendicular to the connecting beam, and a distance is left between the enhancement limiting edge and the connecting end of the wind turbine blade.

The present invention also provides a method for manufacturing a modular wind turbine blade described above, comprising the following steps:

S1: forming the root and tip of the wind turbine blade using vacuum bagging method, and forming multiple modular blades of the intermediate portion using vacuum infusion method;

S2: after solidification and mold removal, performing assembly using another production line to form a wind turbine blade blank; and S3: performing post-processing on the wind turbine blade blank to obtain the final wind turbine blade product.

Further, in S1 the forming process of the modular blade comprises the steps of:

cleaning a mold of the modular blade and coating the molding surface with a release agent;

laying a layered shell structure in the mold;

laying an integrated infusion system and an integrated silicone vacuum system prepared in advance in the area of the shell structure, applying adhesive tapes and maintaining the pressure;

performing vacuum infusion of hand layup resin after a sealing test of the vacuum area;

pre-curing the mold by heating after the infusion is completed; and lowering the cured modular blade to room temperature, followed by demolding of the modular blade and cleaning of the mold.

Further, in S2 the assembly process of the wind turbine blade comprises the steps of:

cutting and cleaning the burrs of the demolded modular blade and completing surface polishing;

transferring the cut and polished modular blade to a corresponding station of the assembly platform where the module is positioned by means of a suction cup device;

applying a structural adhesive to the edge bonding surface of the modular blade and bonding the plurality of modular blades in sequence;

conducting external reinforcement treatment on the assembled wind turbine blade blank;

heating the wind turbine blade blank by a post-curing furnace for curing the wind turbine blade blank; and transferring the cured wind turbine blade blank from the post-curing furnace to the storage yard for cooling.

Further, in S3, the post-processing comprises:

transferring the cooled wind turbine blade blank to a punching station (or a blade root grinding station);

processing the blade root according to process parameters;

transferring the processed blade to a painting station;

cleaning the wind turbine blade blank;

patching the wind turbine blade blank after maintenance and performing shape inspection after the putty is cured;

painting the wind turbine blade blank after the shape inspection;

conducting special construction on the wind turbine blade according to customer requirements; and conducting special inspection before delivery and transferring the qualified blades to the storage yard.

The advantageous effects of the present invention lie in that the wind turbine blade according to the present invention adopts segmented modular structure design, which effectively reduces the mold occupancy time of the blade, shortening the production cycle and improving the molding efficiency.

In the present invention, a plurality of modular blade structures adopt modular molding and modular adhesive assembly, which saves transportation cost.

In the present invention, a plurality of modular blades are connected by means of bosses cooperating with the recesses, and their bosses are embedded in the recesses so that the rounded ends of the bosses fit closely with the arc at the bottom of the recesses, and the recesses wrap around the outside of the bosses to form a sandwich structure, which increases the ability to withstand shear loads and improves the anti-destabilization ability.

In the present invention, the thicker areas in the shell of the blade root and blade tip are made by vacuum bagging method of semi-impregnated low-temperature prepreg with 60% fiber content, which reduces the weight of the blade, and the skin area of the intermediate portion is made by vacuum infusion of hand layup resin, which effectively improves the molding efficiency and reduces the production cost.

In the present invention, the blade root is a tubular structure having a length of 3-5 meters, which is convenient for the application of the winding process, and the weight of the blade root is reduced by at least 30% by the winding process.

DESCRIPTION OF THE DRAWINGS

In order to more clearly illustrate the embodiments of the present invention or the technical solutions in the prior art, the accompanying drawings to be used in the description of the embodiments or prior art will be briefly described below. It is obvious that the accompanying drawings in the following description are only some of the embodiments recorded in the present invention, and other accompanying drawings can be obtained according to these accompanying drawings without creative work for those of ordinary skill in the art.

REFERENCE SIGNS

1. Blade root; 2. Intermediate portion; 21. Trailing edge shell; 22. Leading edge shell; 23. Main beam; 231. Main support beam; 2311. Bent edge; 2312. Enhancement limiting edge; 232. Secondary support beam; 233. Connecting beam; 2331. Fixing recess; 24. Web; 3. Blade tip; 4. First connecting portion; 5. Second connecting portion; 6. Integrated infusion system; 7. Integrated silicone vacuum system; 8. Shell structure; 9. Mold; 10. Suction cup device.

DESCRIPTION OF THE EMBODIMENTS

The technical solutions in the embodiments of the present invention will be described clearly and completely in conjunction with the accompanying drawings in the embodiments of the present invention. Obviously, the described embodiments are only a portion of the embodiments of the present invention, rather than all the embodiments.

It should be noted that when an element is referred to as being "fixed to" another element, it can be directly on the element or an intermediate element may also be present. It should be noted that when an element is referred to as being "connected to" another element, it can be directly on the element or an intermediate element may also be present. The terms "vertical", "horizontal", "left", "right" and similar expressions used herein are for illustrative purposes only and do not mean that they are the only mode of implementation.

Unless otherwise defined, all technical and scientific terms used herein have the same meaning as commonly understood by those skilled in the art of the present invention. The terms used herein are for the purpose of describing specific embodiments only and are not intended to limit the invention. The term "and/or" as used herein includes any and all combinations of one or more of the related listed items.

Figure 1:
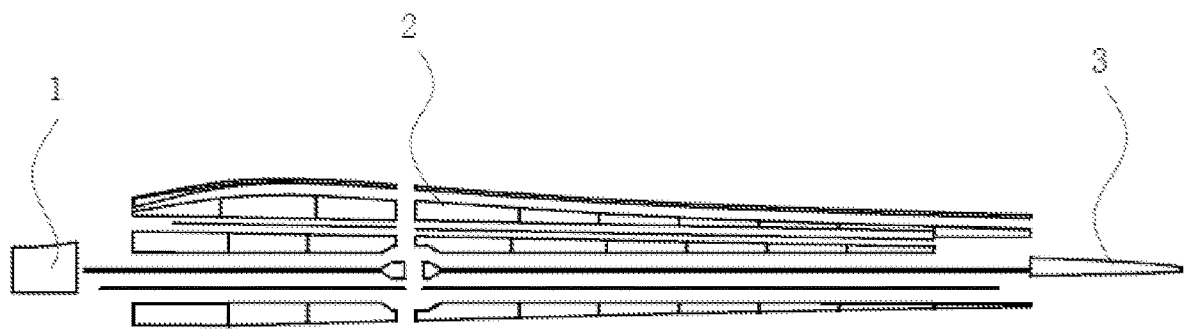
FIG. 1 is an exploded view of a modular wind turbine blade according to an embodiment of the present invention.
Figure 2:
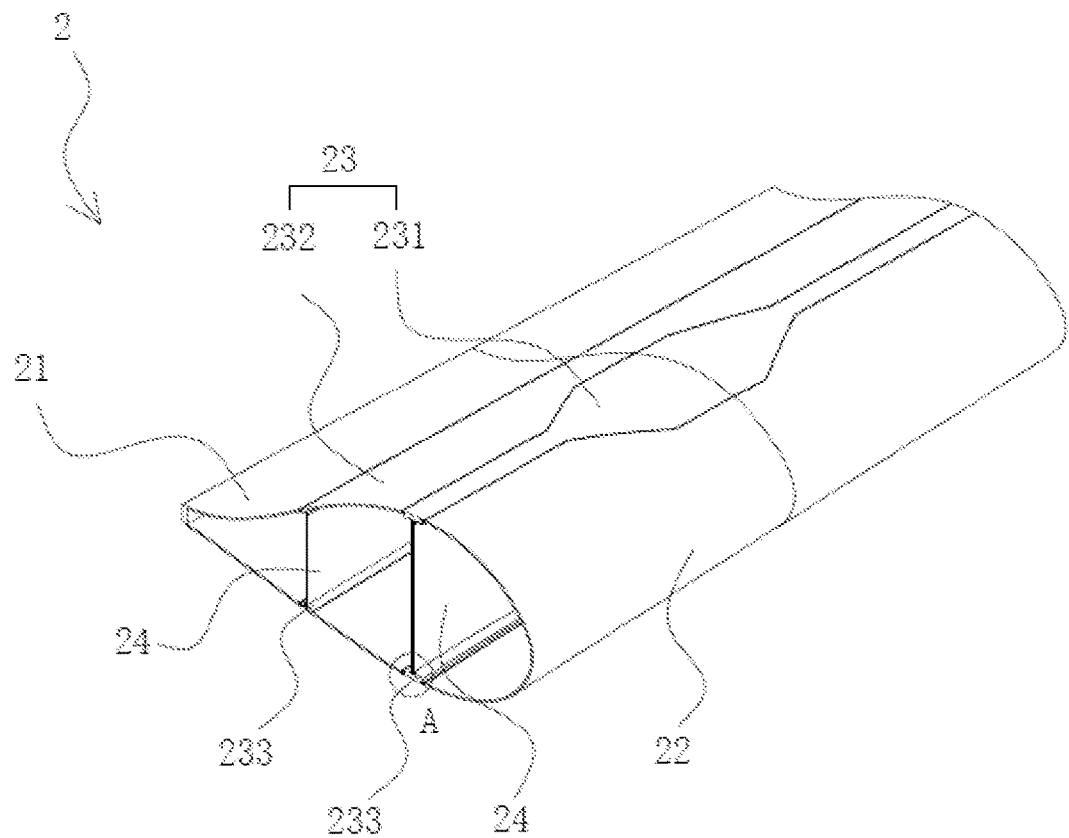
FIG. 2 is a structural representation of the intermediate portion of a wind turbine blade according to an embodiment of the present invention.
Figure 3:
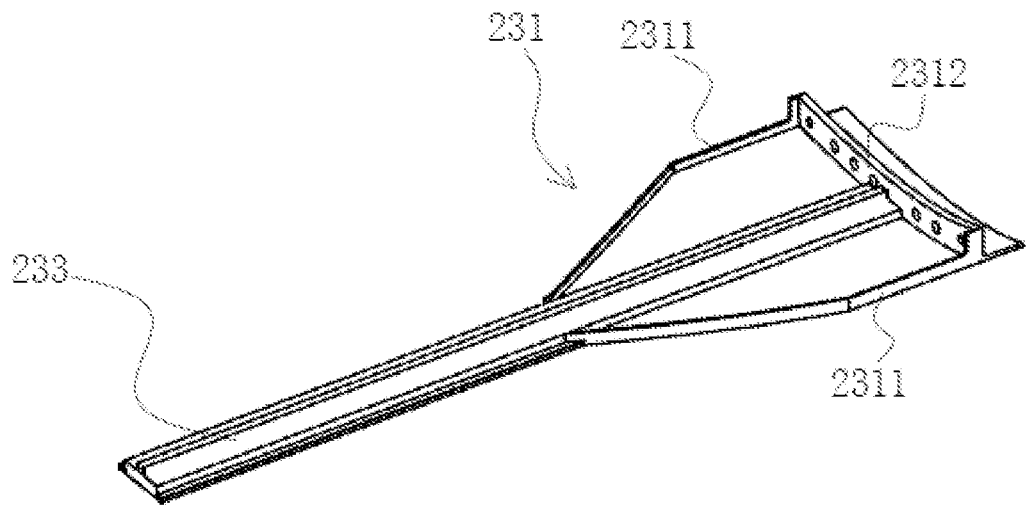
FIG. 3 is the structural representation of main support beam according to an embodiment of the present invention.
Figure 4:
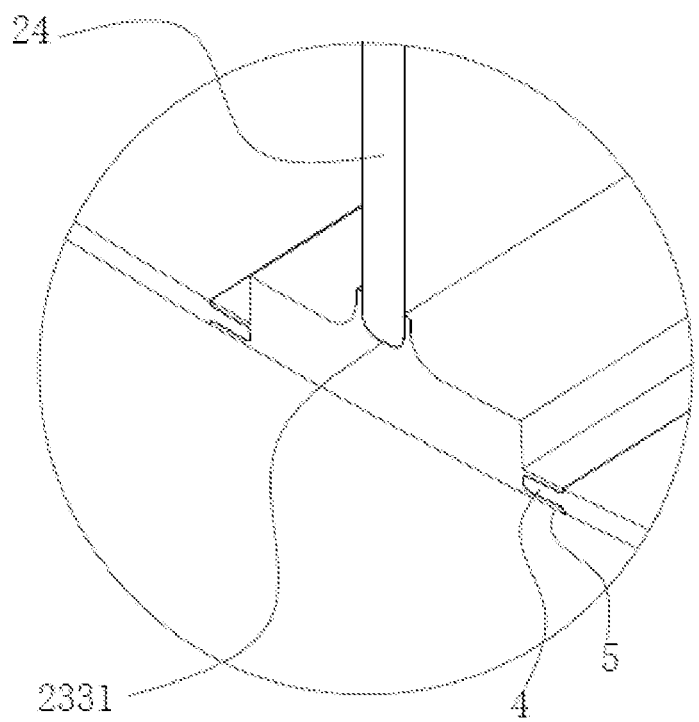
FIG. 4 is a partially enlarged view at A in FIG. 2.

A modular wind turbine blade shown in FIGS. 1 to 4 comprises a blade root 1, an intermediate portion 2 and a blade tip 3, wherein the intermediate portion 2 comprises a plurality of modular blades, two adjacent modular blades being provided at edge thereof with a first connecting portion 4 and a second connecting portion 5 that cooperate with each other, and wherein the plurality of modular blades includes several trailing edge shells 21, several leading edge shells 22 and several main beams 23, respectively, the first connecting portion 4 at the edge of the trailing edge shell 21 and the leading edge shell 22 being fixedly connected to the second connecting portion 5 at the edge of the main beam 23.

As compared with the prior art, the wind turbine blade according to the present invention adopts segmented modular structure design, which effectively reduces the mold occupancy time of the blade, shortening the production cycle and improving the molding efficiency.

In a preferred embodiment of the present invention, the main beam 23 includes a main support beam 231 for connecting the leading edge shell 22 and a secondary support beam 232 for connecting the trailing edge shell 21, the main support beam 231 being fixedly connected to the secondary support beam 232 through the cooperation of the first connecting portion 4 and the second connecting portion 5.

Further, the main support beam 231 and the secondary support beam 232 are each provided with a connecting beam 233, the connecting beam 233 being vertically provided with a fixing recess 2331 for fixing a web 24, the corner of the fixing recess 2331 and the connecting beam 233 being an arc transition.

Specifically, the arc transition increases the strength of the fixing recess 2331 and ensures the stability of the connection of the web 24.

Preferably, the first connecting portion 4 is a boss and the second connecting portion 5 is provided with a recess matching the first connecting portion 4, the boss being embedded in the recess and fixedly connected by means of structural adhesive.

Specifically, a plurality of modular blades are connected by means of bosses cooperating with the recesses, and their bosses are embedded in the recesses so that the rounded ends of the bosses fit closely with the arc at the bottom of the recesses, and the recesses wrap around the outside of the bosses to form a sandwich structure, which increases the ability to withstand shear loads.

In the preferred embodiment of the present invention, the main support beam 231 resembles a shovel-shaped structure close to the connection end of the wind turbine blade segments and a connecting edge extends towards the interior of the wind turbine blade along the edge of the shovel-shaped structure, an end of the connecting edge intersecting with the connecting beam 233 to form a closed area.

The closed area is in the form of a symmetrical trapezoid. The secondary support beam 232 and the leading edge shell 22 are provided with a mounting section corresponding to the trapezoid, and the mounting section is provided at the edge thereof with a fixing edge that matches a bent edge 2311 of the connecting edge.

Specifically, the end of the connecting edge intersects with the connecting beam 233 to form a closed area, which ensures the strength of the main support beam 231 itself, thus improving the wind turbine blade's overall ability to bear the load. In addition, because the cavity of the trailing edge shell 21 is relatively wide, the combination of the two connection forms of the bent edge and the first connecting portion 4 realizes the double reinforcement of the joint of the modular blades, increasing the stability of the connection between the leading edge shell 22 and the trailing edge shell 21 and the main beam 23, and improving the anti-destabilization capacity of the leading edge shell 22 and the trailing edge shell 21. The width direction of the cavity of the trailing edge shell 21 refers to the horizontal direction from the trailing edge shell 21 to the leading edge shell 22.

Further, the reinforcement limiting edge 2312 of the connecting edge located between the two symmetrical bent edges 2311 is provided perpendicular to the connecting beam 233, and the reinforcement limiting edge 2312 has a certain distance from the connecting end of the wind turbine blade. The reinforcement limiting edge 2312 ensures the reliability of the connection of the modularized blades along the length direction.

Figure 5:
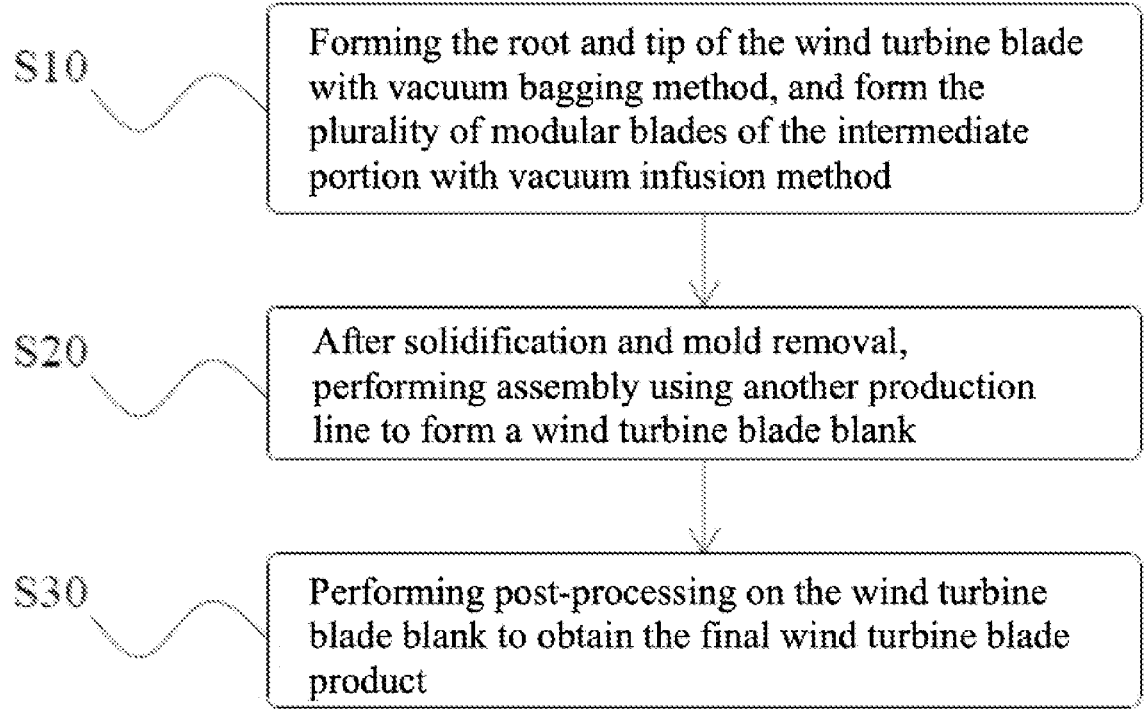
FIG. 5 is a flowchart of a method for manufacturing modular wind turbine blades according to an embodiment of the present invention.
Figure 6:
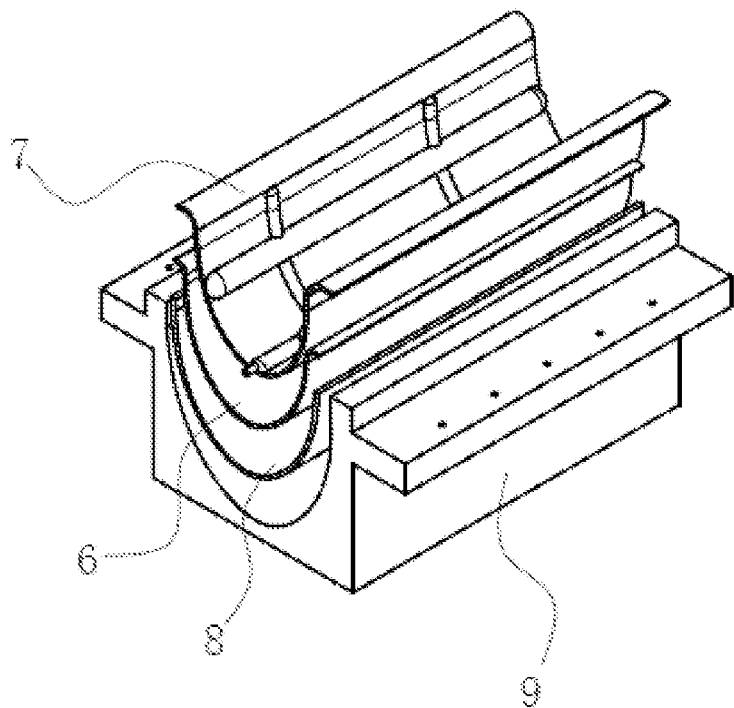
FIG. 6 is a schematic diagram of the infusion of the modular blade in the mold according to an embodiment of the present invention.
Figure 7:
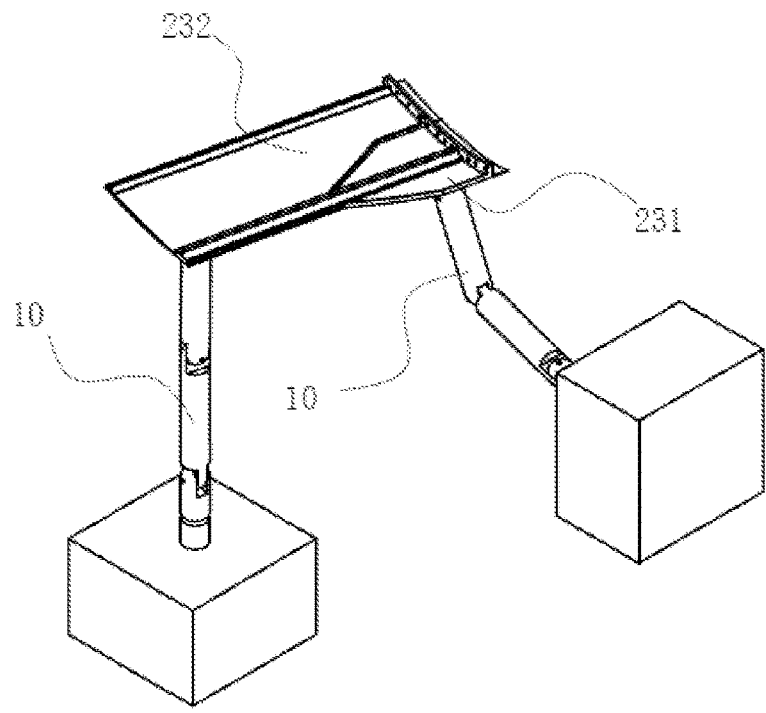
FIG. 7 is a schematic diagram of the positioning of the main support beam and the secondary support beam according to an embodiment of the present invention.
Figure 8:
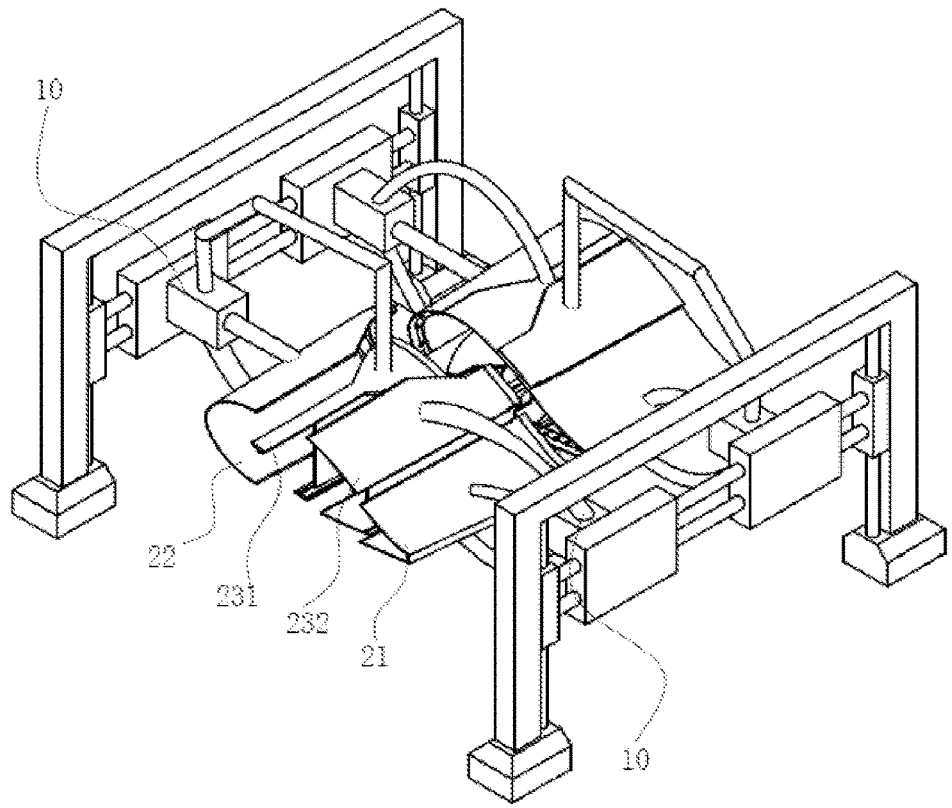
FIG. 8 is a schematic diagram of the integral forming of the respective modular blades according to an embodiment of the present invention.

As shown in FIGS. 5-8, the present invention also provides a method for manufacturing a modular wind turbine blade described above, comprising the following steps:
  S1: forming the root 1 and tip 3 of the wind turbine blade using vacuum bagging method, and forming multiple modular blades of the intermediate portion 2 using vacuum infusion method;
  S2: after solidification and mold removal, performing assembly using another production line to form a wind turbine blade blank; and
  S3: performing post-processing on the wind turbine blade blank to obtain the final wind turbine blade product.

Specifically, the cavity of the blade tip 3 is narrow and integrally formed, which ensures the controllability of the quality and improves the reliability of the performance of the wind turbine blade. Since the blade root 1 is a tubular structure in the range of 3-5 meters, the blade root 1 can be formed by winding process and vacuum bagging method. The winding process reduces the weight of the blade root by 30%, and the automatic winding improves forming efficiency. The thicker areas in the shell of the blade root 1 and blade tip 3 are made by vacuum bagging method of semi-impregnated low-temperature prepreg with 60% fiber content, which reduces the weight of the blade, and the skin area of the intermediate portion 2 is made by vacuum infusion of hand layup resin, which effectively improves the molding efficiency and reduces the production cost.

Further, in S1, the skin structure, which accounts for the largest area of the wind turbine blade, is usually a sandwich structure composed of a small amount of glass fiber and core material, and is molded by material preforming and hand layup resin infusion, comprising the following steps: cleaning the mold 9 of the modular blade and coating the mold release agent on the molding surface;
  laying a layered shell structure 8 in the mold 9, wherein the shell structure 8 is formed by pre-stitching, which is a pre-treatment technique of layering and stitching multiple layers of fiber cloth into the shell structure 8 in sequence by reasonably arranging the module size and material, and the shell structure 8 is placed into the mold 9 as a whole;
  laying an integrated infusion system 6 and an integrated silicone vacuum system 7 prepared in advance in the area of the shell structure 8, applying adhesive tapes and maintaining the pressure, the integrated customization of the infusion system and vacuum system saves laying time and enables rapid laying;
  performing vacuum infusion of hand layup resin after a sealing test of the vacuum area;
  pre-curing the mold 8 by heating after the infusion of the shell structure 8 is completed; and
  lowering the cured modular blade to room temperature, followed by demolding of the modular blade and cleaning of the mold 9.

In the present invention, after fabrication of the respective modular blades, another production line is used for assembly, which improves the utilization efficiency of the mold 9 and improves the bonding efficiency, the assembly process comprises: cutting and cleaning the burrs of the demolded modular blade and completing surface polishing;

transferring the cut and polished modular blade to a corresponding station of the assembly platform where the modular blade is grabbed by a suction cup device 10, wherein the interface on the modular blade is accurately positioned according to the shape of the blade and the division of the module to realize the positioning of the module;

applying a structural adhesive to the edge bonding surface of modular blade and bonding the plurality of modular blades in sequence, wherein a hydraulic device is used to pressurize the interface, so as to realize the connection between the modular blades;

conducting external reinforcement treatment on the assembled wind turbine blade blank;

heating the wind turbine blade blank by a post-curing furnace for curing the wind turbine blade blank; and transferring the cured wind turbine blade blank from the post-curing furnace to the storage yard for cooling.

A reasonable post-processing process can improve the efficiency of the production line. In S3, the post-processing process comprises: transferring the cooled wind turbine blade blank to a punching station (or a blade root grinding station);

processing the blade root according to process parameters;

transferring the processed blade to a painting station;

cleaning the wind turbine blade blank, polishing and cleaning the burrs on the skin and then performing NDT non-destructive testing to complete the external maintenance of the blade;

patching the wind turbine blade blank after maintenance and performing shape inspection after the putty is cured;

painting the wind turbine blade blank after the shape inspection according to the process requirements; and conducting special construction on the wind turbine blade according to customer requirements, the special construction includes but not limited to the leading edge protection, trailing edge noise reduction, vortex generator; and conducting special inspection before delivery and transferring the qualified blades to the storage yard.

From the perspective of the work station, compared with the conventional blade post-processing process, the post-processing process in the present invention cancels the external reinforcement station and cutting and grinding station, since the external reinforcement treatment and cutting and grinding treatment are completed in the assembly process, in which the reinforcement treatment is carried out on the assembly tooling and the cutting and grinding is carried out on the transfer tooling, reducing the post-processing station and shortening the post-processing cycle.

Those skilled in the industry should understand that the present invention is not limited by the foregoing embodiments. The foregoing embodiments and descriptions only illustrate the principles of the present invention. Without departing from the spirit and scope of the present invention, the present invention will have various changes and improvements, which fall within the scope of the claimed invention. The scope of protection claimed by the present invention is defined by the appended claims and their equivalents.

The invention claimed is:

1. A modular wind turbine blade comprising a blade root (1), an intermediate portion (2) and a blade tip (3), wherein the intermediate portion (2) comprises a plurality of blade portions, two adjacent blade portions of the plurality of the blade portions being provided at edge thereof with a first connecting portion (4) and a second connecting portion (5) that cooperate with each other, wherein each of the plurality of blade portions includes a trailing edge shell (21), a leading edge shell (22) and a main beam (23), the first connecting portion (4) being at the edge of the trailing edge shell (21) and the leading edge shell (22) is fixedly connected to the second connecting portion (5) being at the edge of the main beam (23), wherein the main beam (23) includes a main support beam (231) for connecting the leading edge shell (22) and a secondary support beam (232) for connecting the trailing edge shell (21), the main support beam (231) is fixedly connected to the secondary support beam (232) through the cooperation of the first connecting portion (4) and the second connecting portion (5), wherein the main support beam (231) and the secondary support beam (232) are each provided with a connecting beam (233), the connecting beam (233) being vertically provided with a fixing recess (2331) for fixing a web (24), a corner of the fixing recess (2331) and the connecting beam (233) being an arc transition, wherein the main support beam (231) has a shovel-shaped structure close to a connection end of the wind turbine blade segments, and a connecting edge extends towards an interior of the wind turbine blade along an edge of the shovel-shaped structure, an end of the connecting edge intersecting with the connecting beam (233) to form a closed area, wherein the closed area has a symmetrical trapezoid shape, the secondary support beam (232) and the leading edge shell (22) are provided with a mounting section corresponding to the trapezoid, and the mounting section is provided at the edge thereof with a fixing edge that matches a bent edge (2311) of the connecting edge, and wherein a combination of two connection forms of the bent edge (2311) and the first connecting portion (4) realizes a double reinforcement of a joint of the blade portions, increasing a stability of the connection between the leading edge shell (22) and the trailing edge shell (21) and the main beam (23), and improving an anti-destabilization capacity of the leading edge shell (22) and the trailing edge shell (21).

2. The modular wind turbine blade according to claim 1, wherein the first connecting portion (4) is a boss and the second connecting portion (5) is provided with a recess matching the first connecting portion, the boss being embedded in the recess and fixedly connected by means of structural adhesive.

3. The modular wind turbine blade according to claim 1, wherein an enhancement limiting edge (2312) of the connecting edge located between the two symmetrical bent edges (2311) is provided perpendicular to the connecting beam (233), and a distance is left between the enhancement limiting edge (2312) and the connecting end of the wind turbine blade.

4. A method for manufacturing the modular wind turbine blade according to claim 1, comprising the following steps:

S1: forming the root (1) and tip (3) of the wind turbine blade using vacuum bagging method, and forming the plurality of modular blade portions of the intermediate portion (2) using vacuum infusion method;

S2: after solidification and mold removal, performing assembly using another production line to form a wind turbine blade blank; and S3: performing post-processing on the wind turbine blade blank to obtain the final wind turbine blade product.

5. The method for manufacturing the modular wind turbine blade according to claim 4, wherein in S1 the forming process of the modular blade comprises the steps of:
- cleaning a mold (9) of the modular blade and coating a molding surface with a release agent;
- laying a layered shell structure (8) in the mold (9);
- laying an integrated infusion system (6) and an integrated silicone vacuum system (7) prepared in advance in an area of the shell structure (8), applying adhesive tapes and maintaining pressure;
- performing vacuum infusion of hand layup resin after a sealing test of a vacuum area;
- pre-curing the mold (9) by heating after the infusion is completed; and
- lowering the cured modular blade to room temperature, followed by demolding of the modular blade and cleaning of the mold (9).

6. The method for manufacturing the modular wind turbine blade according to claim 5, wherein in S2 the assembly process of the modular blade comprises the steps of:
- cutting and cleaning burrs of the demolded modular blade and completing surface polishing;
- transferring the cut and polished modular blade to a corresponding station of an assembly platform where the modular blade is positioned by means of a suction cup device (10);
- applying a structural adhesive to an edge bonding surface of the modular blade and bonding the plurality of modular blade portions in sequence;
- conducting external reinforcement treatment on the assembled wind turbine blade blank;
- heating the wind turbine blade blank by a post-curing furnace for curing the wind turbine blade blank; and
- transferring the cured wind turbine blade blank from the post-curing furnace to a storage yard for cooling.

7. The method for manufacturing the modular wind turbine blade according to claim 6, wherein in S3 the post-processing of the modular blade comprises the steps of:
- transferring the cooled wind turbine blade blank to a punching station or a blade root grinding station;
- processing the blade root according to process parameters;
- transferring the processed blade to a painting station;
- cleaning the wind turbine blade blank;
- patching the wind turbine blade blank after maintenance and performing shape inspection after a putty is cured;
- painting the wind turbine blade blank after the shape inspection;
- conducting special construction on the wind turbine blade according to customer requirements; and
- conducting special inspection before delivery and transferring the qualified blades to the storage yard.

* * * * *